United States Patent
Lin-Hendel (10) Patent No.: US 9,396,822 B2
(45) Date of Patent: Jul. 19, 2016

(54) EMERGENCY AND BACK-UP COOLING OF NUCLEAR FUEL AND REACTORS

(71) Applicant: Catherine Lin-Hendel, Los Gatos, CA (US)

(72) Inventor: Catherine Lin-Hendel, Los Gatos, CA (US)

(*) Notice: Subject to any disclaimer, the term of this patent is extended or adjusted under 35 U.S.C. 154(b) by 218 days.

(21) Appl. No.: 13/826,293

(22) Filed: Mar. 14, 2013

(65) Prior Publication Data

US 2014/0105348 A1    Apr. 17, 2014

Related U.S. Application Data

(60) Provisional application No. 61/611,585, filed on Mar. 16, 2012.

(51) Int. Cl.
| | |
|---|---|
| *G21C 15/18* | (2006.01) |
| *G21C 9/004* | (2006.01) |
| *G21D 1/02* | (2006.01) |
| *G21D 3/04* | (2006.01) |

(52) U.S. Cl.
CPC ............... *G21C 15/18* (2013.01); *G21C 9/004* (2013.01); *G21D 1/02* (2013.01); *G21D 3/04* (2013.01); *Y02E 30/40* (2013.01)

(58) Field of Classification Search
CPC .... G21C 15/18; G21C 15/182; G21C 15/185; G21C 15/187
USPC .................................................. 376/282, 299
See application file for complete search history.

(56) References Cited

U.S. PATENT DOCUMENTS

| | | | | |
|---|---|---|---|---|
| 3,508,090 | A | * | 4/1970 | Crampton et al. ............... 310/11 |
| 3,900,366 | A | * | 8/1975 | Sakaguchi ..................... 376/282 |
| 3,968,653 | A | * | 7/1976 | Cachera ........................ 376/298 |
| 4,025,388 | A | * | 5/1977 | Jackson ........................ 376/338 |
| 4,495,140 | A | * | 1/1985 | Kochka et al. ................. 376/207 |
| 4,694,693 | A | * | 9/1987 | Gerlowski ..................... 376/281 |
| 4,819,919 | A | | 4/1989 | Taylor |
| 4,971,752 | A | * | 11/1990 | Parker .......................... 376/288 |
| 5,077,000 | A | | 12/1991 | Bice et al. |
| 5,085,825 | A | * | 2/1992 | Gluntz et al. ................. 376/282 |
| 5,499,278 | A | * | 3/1996 | Gluntz .......................... 376/299 |
| 5,807,086 | A | | 9/1998 | Powell et al. |
| 2008/0285701 | A1 | * | 11/2008 | Meseth ......................... 376/282 |

(Continued)

FOREIGN PATENT DOCUMENTS

| | | | |
|---|---|---|---|
| DE | 3100716 | * | 8/1982 |
| DE | 3100716 | A1 | 8/1982 |
| EP | 0466052 | A1 | 1/1992 |

(Continued)

OTHER PUBLICATIONS

McGregor, Tom; Can Yukio Edano Save Japan with Liquid Nitrogen?: http://www.dallasblog.com/201103161007858/dallas-blog/can-yukio-edano-save-japan-with-liquid-nitrogen.html; Mar. 16, 2011.

Chinese Examination Search Report for CN 201380014598.3, dated Dec. 31, 2015, pp. 1-7.

European Search Report for EP 13800668.9, dated Oct. 2, 2015, pp. 1-7.

*Primary Examiner* — Jack W Keith
*Assistant Examiner* — Daniel Wasil
(74) *Attorney, Agent, or Firm* — Barnes & Thornburg LLP; Thomas J. McWilliams; Edward F. Behm, Jr.

(57) ABSTRACT

An embodiment uses liquid nitrogen, the densest and highly transportable form of nitrogen, and the cold nitrogen gas it produces when released from its container, for emergency cooling of fuel rods and nuclear reaction chambers.

4 Claims, 5 Drawing Sheets

(56) References Cited

U.S. PATENT DOCUMENTS

2012/0002776 A1* 1/2012 DuBrucq ................ 376/384
2013/0208846 A1* 8/2013 Pockrandt ................ 376/282

FOREIGN PATENT DOCUMENTS

| JP | S63293497 A | 11/1988 |
| JP | 2001066029 A | 3/2001 |

* cited by examiner

EMERGENCY AND BACK-UP COOLING OF NUCLEAR FUEL AND REACTORS

PRIORITY CLAIM

This application claims the priority benefit of, and incorporates by reference as if fully set forth herein, U.S. Provisional Appl. No. 61/611,585 filed Mar. 16, 2012.

BACKGROUND OF THE INVENTION

In a nuclear power generation facility, a nuclear reactor core (a/k/a, reactor vessel) contains nuclear fuel rods, and is equipped to initiate, control, and sustain nuclear chain reaction in the nuclear fuel rods to generate heat. The heat generated by the nuclear reaction is absorbed by a circulating primary coolant into which the fuel rods are immersed, maintaining a stable operating temperature. The circulating coolant limits the operating temperature and thus keeps the nuclear reaction in control; it also carries away the heat generated by the controlled nuclear reaction which is in turn used to produce pressurized steam that drives a turbine. The turbine in turn drives a power generator to produce electricity. The most common types of nuclear reactors use closed-loop circulating purified water as the primary coolant, which in Boiling Water Reactors is boiled into steam by the nuclear reaction to drive a turbine, and then condensed back into liquid phase to be cooled with separate cycling cooling water drawn from a large body of external supply, such as a sea, a river, or a lake. An older version of nuclear power reactor design, the Pressured Water Reactor (PWR) further separates the reactor vessel coolant from the heated water that generates steam to drive a turbine.

The nuclear fuel material is contained in a tube-like rod made with radiation-neutral zirconium alloy. Such an assembly is called a fuel rod. During the reactor operation in the power generating mode, the surface temperature of the fuel rod cladding is normally kept at approximately 280 degrees Celsius. The nuclear reaction is further moderated and controlled by control rods inserted between the fuel rods to absorb neutrons generated by nuclear reactions in the fuel rods. The zirconium alloy is transparent to neutrons, which is the reason it is used as the cladding material for the nuclear fuel. Unfortunately, when heated to 550 degrees Celsius or above, zirconium reacts with steam and generates hydrogen, which is highly explosive at high temperature and the presence of oxygen. Explosions in and around a nuclear reactor in such a situation are certain to spew extremely dangerous radioactive material into the environment. Furthermore, the disintegration of the fuel cladding causes the nuclear fuel material to fall to the bottom of the reactor vessel to continue the out of control nuclear reaction and the continued elevation of temperature, which is called a melt-down.

Even when the reactor is shut down and the stimulated chain reaction is stopped, the nuclear fuel will continue its intrinsic decay and reaction, with the generated heat spontaneously increasing the rate of reaction until the remaining reactive material is entirely spent. Cooling the nuclear material therefore is critical to keep the reaction under control and below a threshold rate that can cause spontaneous acceleration. Above that threshold the spontaneous acceleration of reactive processes will lead to out-of-control conditions which may result in harmful radiation with the accompanying radioactive by-products to be released into the environment. Therefore, whether the fuel rods remain in the reactor vessel, or are kept in storage outside the reactor vessel, the continual cooling of the fuel rods is required at all times. Even spent nuclear fuel is typically stored in cold water pools and needs to be continually cooled for several years before the spent fuel rods can be safely removed to dry and permanent storage. When an accident, equipment malfunction, loss of power, or operator error causes the reactor to lose cooling, which is conventionally facilitated only by electrically powered pumps circulating the primary and secondary coolants immersing the fuel rods, the fuel rods will rapidly heat up resulting in a self-propelling cycle of increased heating and accelerated nuclear activity, soon reaching the critical temperature of 550 degrees Celsius and higher, where the zirconium cladding will react with steam. In the presence of water vapor in the vicinity of the fuel rods, the zirconium and steam react to immediately generate copious amounts of explosive hot hydrogen gas. When brought into contact with any form of oxygen in the environment, disastrous explosions result until the zirconium and the nuclear reactive material are both exhausted, the environment totally destroyed, or safe cooling is installed and the temperature is brought under control.

$$Zr+4H_2O@\sim550C=Zr(OH)_4+4H_2$$

In addition, when zirconium alloy casing disintegrates during its reaction with steam, it allows the nuclear fuel pallets to drop to the bottom of the steel reactor vessel, out of reach of all other conventional nuclear activity control mechanisms that may still be functioning. The fuel temperature in that case would continue to rise even more rapidly until the fuel melts and forms a pool at the bottom of the reactor vessel which can burn through the vessel wall into the floor of containment chamber, and even melt through the containment chamber floor, and expose the molten nuclear fuel, its continual nuclear reaction, and massive radioactive by-products into the environment. This is called a nuclear meltdown.

In the case of the recent Fukushima Nuclear Reactor crisis in Japan, the electrically powered cooling system failed through the earthquake, and the backup electrical power generators failed due to the tsunami flooding. The fuel rods in the six reactors and the cold water pools that store the spent fuel lost cooling.

After the tsunami passed, the Japanese Government and TEPCO (Tokyo Electric Power Corporation) operators used portable generators and pumps to pump sea water into the power plants and reactor vessel to cool the overheated fuel rods. Concerned that the sea water is highly corrosive, under Japanese Government's request for assistance, US ships shipped a vast amount of purified water to the Fukushima site for cooling the reactor vessels. Unfortunately, the vast amount of steam thus generated, whether from sea water or from purified water, interacted with the overheated zirconium cladding of the fuel rods (at and above 550 degree C.) and produced copious amounts of hydrogen gas, resulting in repeated explosions.

DETAILED DESCRIPTION

Figure 1:
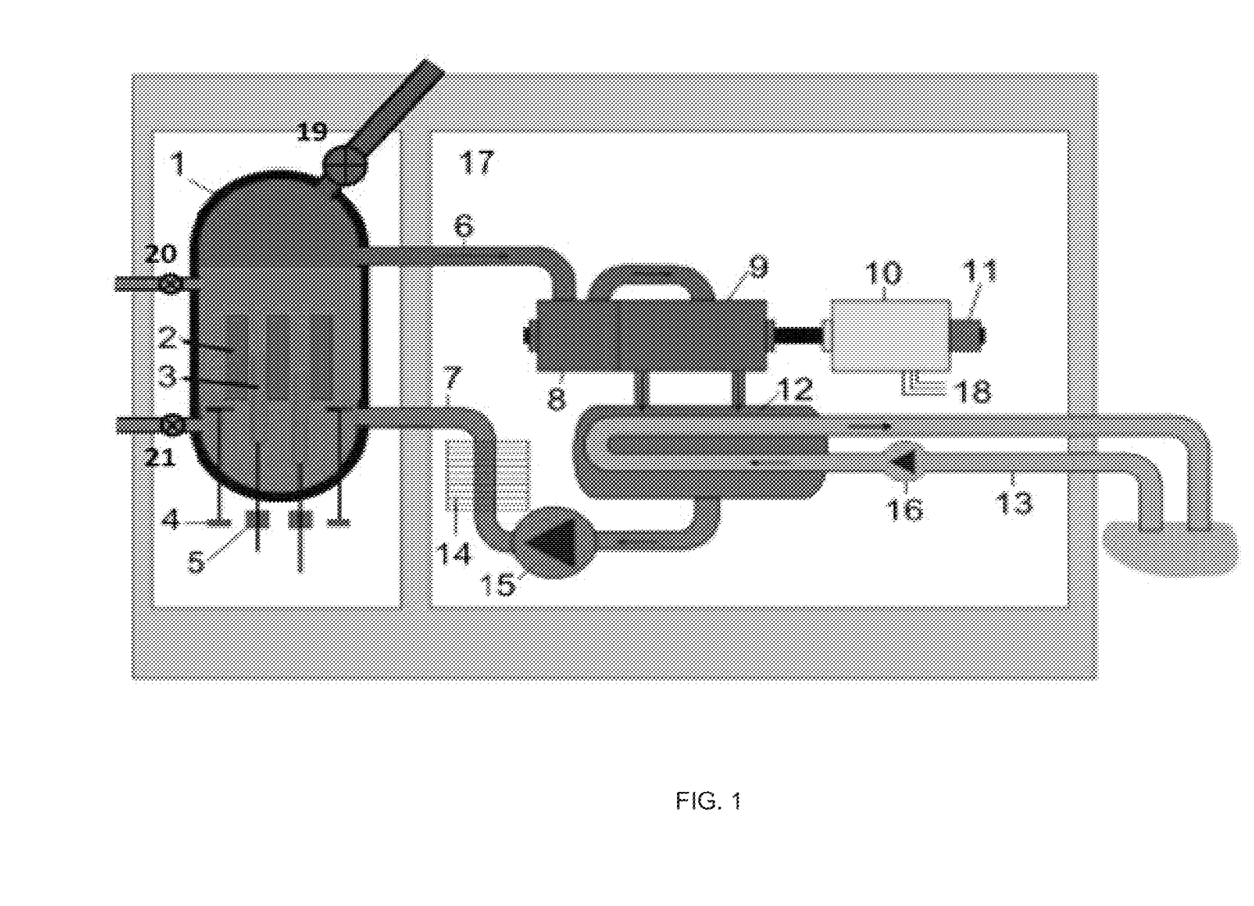
FIG. 1 is a side schematic view of a Boiled Water Nuclear Reactor and its cooling system.

| Index of Elements | |
|---|---|
| 1. | Reactor Chamber, or Reactor Pressure Vessel (RPV) |
| 2. | Nuclear fuel elements (rods) |
| 3. | Control rods |
| 4. | Circulation pumps |
| 5. | Control rod motors |
| 6. | Steam |
| 7. | Feed-water |
| 8. | High pressure turbine (HPT) |
| 9. | Low pressure turbine |
| 10. | Generator |
| 11. | Exciter |
| 12. | Condenser |
| 13. | Coolant |
| 14. | Pre-heater |
| 15. | Feed-water pump |
| 16. | Cold water pump |
| 17. | Concrete enclosure, the Containment Chamber |
| 18. | Connection to electricity grid |
| 19. | Pressure Release Outlet and Valve |
| 20. | Coolant Intake or Outlet with control valve |
| 21. | Coolant Intake or Outlet with control valve. |

One or more embodiments use liquid nitrogen, the densest and highly transportable form of nitrogen, and the cold nitrogen gas it produces when released from its container, for emergency cooling of fuel rods and nuclear reaction chambers. An embodiment includes a liquid nitrogen back-up cooling system to be installed in addition to the existing water cooling systems in today's nuclear power plants to improve nuclear power reactor safety.

Nitrogen gas is inert. Under atmospheric pressure, its boiling point is minus-196 degrees Celsius. Liquid nitrogen is kept in a well-insulated and pressurized container to help retain its liquid phase. No electricity or pumping action is required to release liquid nitrogen from its container into a warmer or less pressurized environment, making it a highly effective, safe, and rapid coolant when no electrical power is available, or when the nuclear reactor and fuel of concern is already over heated. Furthermore, Boron powder can be incorporated with liquid nitrogen or compressed cold nitrogen gas to absorb neutrons released from nuclear fuel to further dampen and slow the nuclear reaction.

Liquid nitrogen is an extremely compact, extremely cold, and readily transportable source of the inert nitrogen gas. Further, its temperature at atmospheric pressure being minus 196 Degrees C, far below the freezing point of water, makes it extremely useful in a wide range of applications, including as an open-cycle refrigerant or coolant.

Liquid nitrogen and nitrogen gas are both chemically inert and do not react with other substances. The large quantity of nitrogen gas evolved from evaporating liquid nitrogen as it comes in contact with high temperature objects, dilutes and displaces other gases present, such as hydrogen or oxygen, making it an asphyxiate gas, capable of putting out fire, and maybe hazardous to breathing due to the diluted oxygen content.

Liquid nitrogen is self-pressurized in its container. When released from its container, liquid nitrogen ejects with force. The higher the container is pressurized, the higher the ejection force and its reach.

In an embodiment, for emergency cooling after an event that caused power loss and over-heating of the reactor chamber and fuel rods is suspected, one can spray the exterior of the reactor chamber immediately to help reduce the temperature within the chamber through convection. Simultaneously, preparation to inject liquid nitrogen into the reactor chamber should be taken, and injection directly inside the reactor chamber toward the fuel rods, with the goal to reach the fuel rods should ensue as quickly as possible. Both measures require no pumping action and no electricity. One can connect the outlet of an adequately large, filled and pressurized liquid nitrogen container to an insulated flexible hose. The hose can be directed to the spraying action for the first measure, and to a water/coolant inlet of the reactor chamber for the second measure, and open the outlet valve of the liquid nitrogen container. If the inlet valve of the coolant inlet of the reactor chamber is not already open, it should also be opened. After a nuclear accident, when radioactive material may already be in the area, these activities should be accomplished by using a robot, or using a trained operator with adequate protective gears.

When the outlet valve is opened, pressurized liquid nitrogen in its container automatically ejects out of the LN storage container into the environment, or into the reactor chamber the hose is connected to. As stated above, neither pumping action nor electricity is needed to achieve this ejection. One can similarly fill the containment chamber surrounding the reactor chamber with the cold nitrogen gas produced by releasing liquid nitrogen from its container into the containment chamber. Alternatively, compressed nitrogen gas tanks can be used for this purpose. Liquid nitrogen is widely available, and contains a far-higher quantity of nitrogen gas within the volume of a given container; thus, it is far more efficient to transport than is compressed nitrogen gas. The injection of nitrogen into an environment where oxygen and hydrogen are present greatly dilutes the density and proximity of the oxygen and hydrogen, and may thus prevent an explosion caused by the chemical interaction between hydrogen and oxygen.

The pressurized liquid nitrogen injected into the reactor chamber and the extremely cold nitrogen vapor evolved from liquid nitrogen will quickly quench the fuel rods, condense the steam, and freeze the remaining water in the chamber. This cooling method practically reduces the explosion risk of any hydrogen that may have already gathered in the chamber before the injection of liquid nitrogen to near zero, and prevents further generation of hydrogen. The nitrogen vapor produced from the liquid-phase nitrogen during this fuel rod and chamber cooling process is also very cold, and when released into the atmospheric environment outside of the reactor chamber, the nitrogen vapor dilutes and displaces the oxygen in the environment, greatly reducing the explosion risk of any hydrogen present.

Furthermore, boron powder or other neutron absorbing materials or compounds can be placed inside the liquid nitrogen container before filling it with liquid nitrogen. Using the ejection force of liquid nitrogen, the boron powder is mixed with liquid nitrogen and injected into the reactor chamber. Boron slows or halts the nuclear reaction by absorbing neutrons generated by the spontaneous decay and reaction of the nuclear fuel.

One method, in an embodiment, is to install valves and inlet/outlet at both ends of an LN container intended for use at a nuclear power plant. Subsequently, insert boron powder into such an empty LN container before filling it with LN. Connect one inlet/outlet to a large liquid nitrogen source, and the other inlet/outlet to the target nuclear reactor chamber. First open the valve of the LN container outlet and the inlet to the target nuclear reactor chamber. Then open the inlet of LN container to allow LN from a large LN container to flow into the double inlet/outlet smaller LN container filled with Boron powder. The pressurized ejection of LN from the large source container through the boron filled container, and then into the reactor chamber will spray the boron powder into the reactor chamber and coat objects within. In an embodiment, one may partially fill an LN container with boron powder before filling it with LN, and rotate the container about an axis thereof to combine gravity feed with the ejection force of the LN to also eject the boron powder along with the ejecting LN into the reaction chamber to coat the fuel rods. This process can be repeated by replacing emptied out LN/Boron container with a full one, and releasing nitrogen along with boron as long as needed, until the fuel rods are cooled to a sufficiently cool temperature, and the nuclear activity is sufficiently low.

Another embodiment of the invention is to install an automated liquid nitrogen backup cooling system to a nuclear power reactor chamber, wherein the liquid nitrogen container is built with or connected to a temperature and/or pressure activated valve which opens at a predetermined threshold temperature or pressure to allow LN to inject into the reactor vessel. The LN container build for this purpose may also contain two ports. One port may be connected to a nuclear reactor chamber or a containment chamber and equipped with said temperature and/or pressure activated valve pre-set at a threshold temperature or pressure. The 2nd port may be connected to a refilling large on-site LN storage tank. This port can be an open connection to the refill large tank, or equipped with a pressure-activated valve, which opens when the pressure in the smaller LN container drops to indicate a significant ejection of the LN content into the reactor or containment chamber.

The wall of the reactor vessel may be optionally coated with a ceramic thermal insulator such as boron nitride to insulate the nitrogen injected into the reactor chamber from external ambient temperature to help maintain its low temperature.

Another embodiment may have the pre-installed LN insulated containers (Dewar) prefilled with a desired amount of boron powder.

Another embodiment may have an additional onsite large LN storage tank that automatically feeds into the LN container directly hooked to the reactor chamber, as its content LN is emptying into the reactor chamber.

Another embodiment of the invention may include connecting a filled LN container to a containment chamber, through a temperature gauge. An additional onsite large LN storage tank can be connected to the LN container that is connected to the containment chamber, and automatically feeds LN into the LN Dewar hooked to the containment chamber, as its LN content is emptying into the containment chamber.

Another embodiment may have one onsite large LN storage tank that automatically pressure feeds the LN Dewar hooked to the reactor vessel and the LN Dewar connected to the containment chamber.

The walls of pools containing spent fuel cells may also be coated with thermal insulating material, and an insulated pool cover installed. When rapid cooling is needed, liquid nitrogen or boron infused LN can be injected into the pool to cool the spent fuel. Even without thermal insulation coating on the walls and the pool cover, a spent fuel pool still may have a temperature activated backup LN nitrogen cooling equipment installed.

Another embodiment may be to install an LN fabrication plant that automatically manufactures and fills the large LN storage tank and the smaller LN containers that are directly connected to fill reactor chambers, containment chambers, and spent fuel pools. In case of power outage, the LN fabrication plant can be powered by back up generators and batteries located at higher levels. This is particularly of interest in locations with multiple reactors, such as the Fukushima site.

Regardless of what cooling method is used (even with water cooling), there will be significant amounts of gas that require release. The Fukushima explosions were caused by the hot hydrogen gas released from the reactor chamber reacting with oxygen in the environment. A bank of "scrubbers" that take out radioactive components and dangerous gases such as hydrogen from the exhaust and pressure-relief outlet may be employed in an embodiment. Scrubbers are used in the semiconductor industry to clean exhaust, and are highly effective in eliminating, or at least limiting dangerous outgas release into the environment.

FIG. 1, illustrates a conceptual schematics of a Boiled Water Nuclear (BWN) Reactor and its cooling system. Items 1-18 as labeled are common components in a conventional BWN reactor. Vent 19 and valve controlled additional coolant inlet/outlet 20 and 21 may or may not exist in a conventional BWN reactor chamber. If exist, 20 and/or 21 and can be used for injecting liquid nitrogen and the cold nitrogen gas evolves from the liquid nitrogen into the reactor chamber to cool the chamber and the fuel rods within. If 19, 20, and 21 do not exist, steam outlet 6 can be disconnected from the Turbine and used as an emergency over-pressure relieve outlet, and coolant water inlet 7 can be used to inject liquid nitrogen and cold nitrogen gas into the reactor chamber. The same principle and practice can be used in all other types of nuclear reactors.

In a conventional nuclear power plant, back up cooling is driven by backup power connected to its regular cooling system when regular power source is lost.

Figure 2:
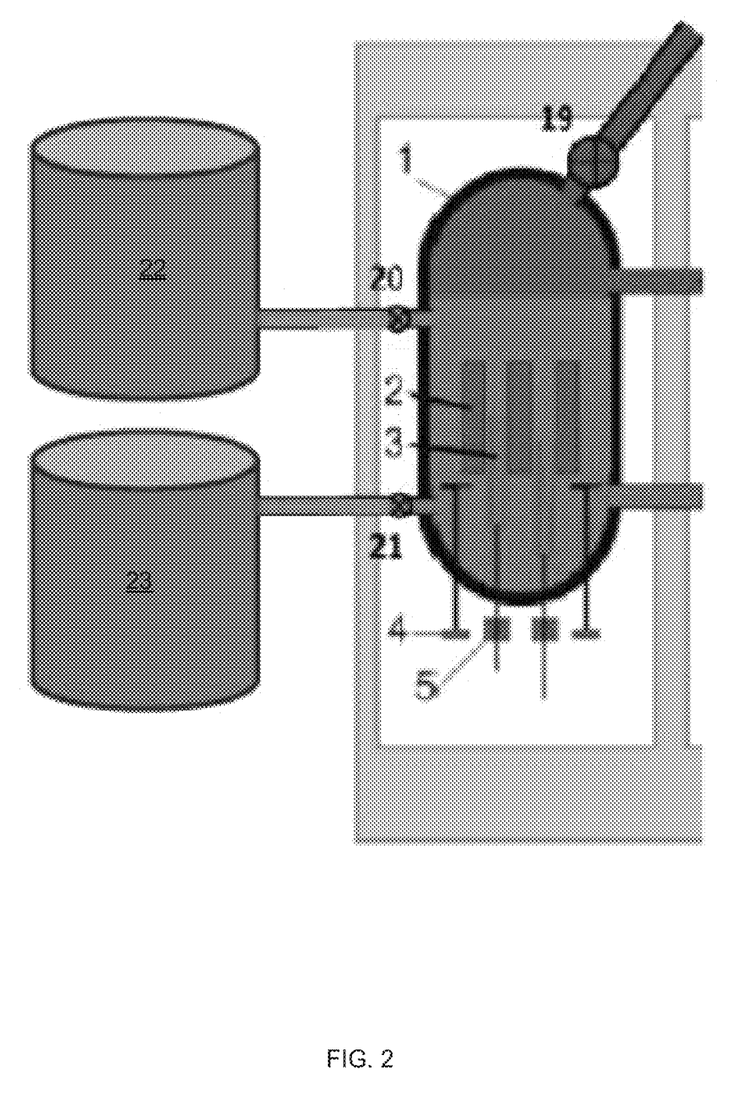
FIG. 2 shows a liquid-nitrogen (LN) Container connected to a Coolant Inlet/Outlet of a Reactor Chamber in accordance with an embodiment of the present invention.

FIG. 2: During emergency cooling, a liquid nitrogen Container 22 is brought to site and connected to a Coolant Inlet/Outlet 20 of the Reactor Chamber. If feasible, a second LN Container 23 can be connected to Inlet/Outlet 21. Alternatively, a vacuumed container can be connected to Outlet 21, and used to receive overpressurized nitrogen gas from the reactor chamber.

Figure 3:
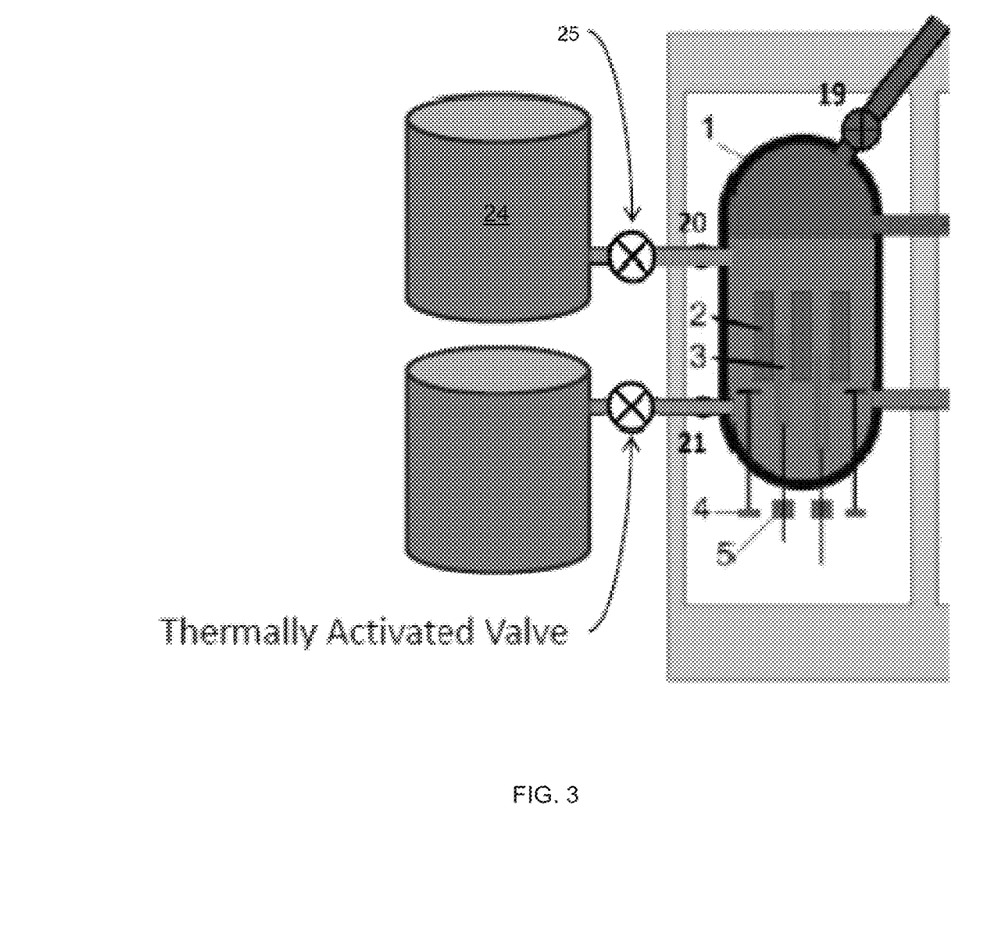
FIG. 3 shows a filled liquid nitrogen container connected to a nuclear reactor chamber through a thermally activated valve in accordance with an embodiment of the present invention.

FIG. 3: In a pre-installed back-up liquid nitrogen cooling system, at least one filled liquid nitrogen container 24 is connected to a nuclear reactor chamber through a thermally activated valve 25. When ambient temperature in the Chamber rises to a predetermined safety threshold temperature, the liquid nitrogen in the container is released into the reactor chamber to quickly bring down the chamber and fuel rod temperatures. The liquid nitrogen containers may also be partially prefilled with boron powder to help slow down the nuclear chain reaction.

Figure 4:
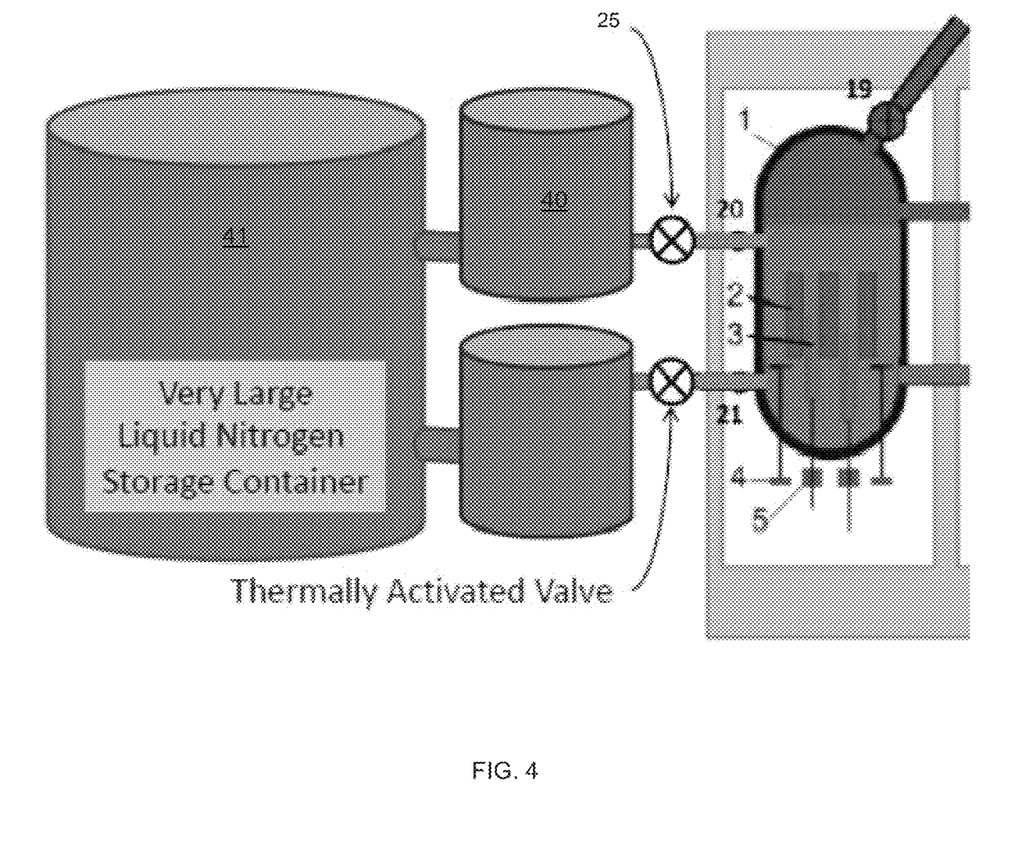
FIG. 4 shows a liquid nitrogen storage container linked to a smaller liquid nitrogen container that is connected to a nuclear reactor chamber or a containment chamber through a thermally activated valve in accordance with an embodiment of the present invention.

FIG. 4 shows a very large liquid nitrogen storage container 41, linked to at least one smaller liquid nitrogen container 40 that is connected to a nuclear reactor chamber or a containment chamber through a thermally activated valve 25. The large storage container 41 automatically fills the smaller LN container(s) 40 connected to the reactor chamber or containment chamber as its LN content is released into the reactor chamber or the containment chamber.

Figure 5:
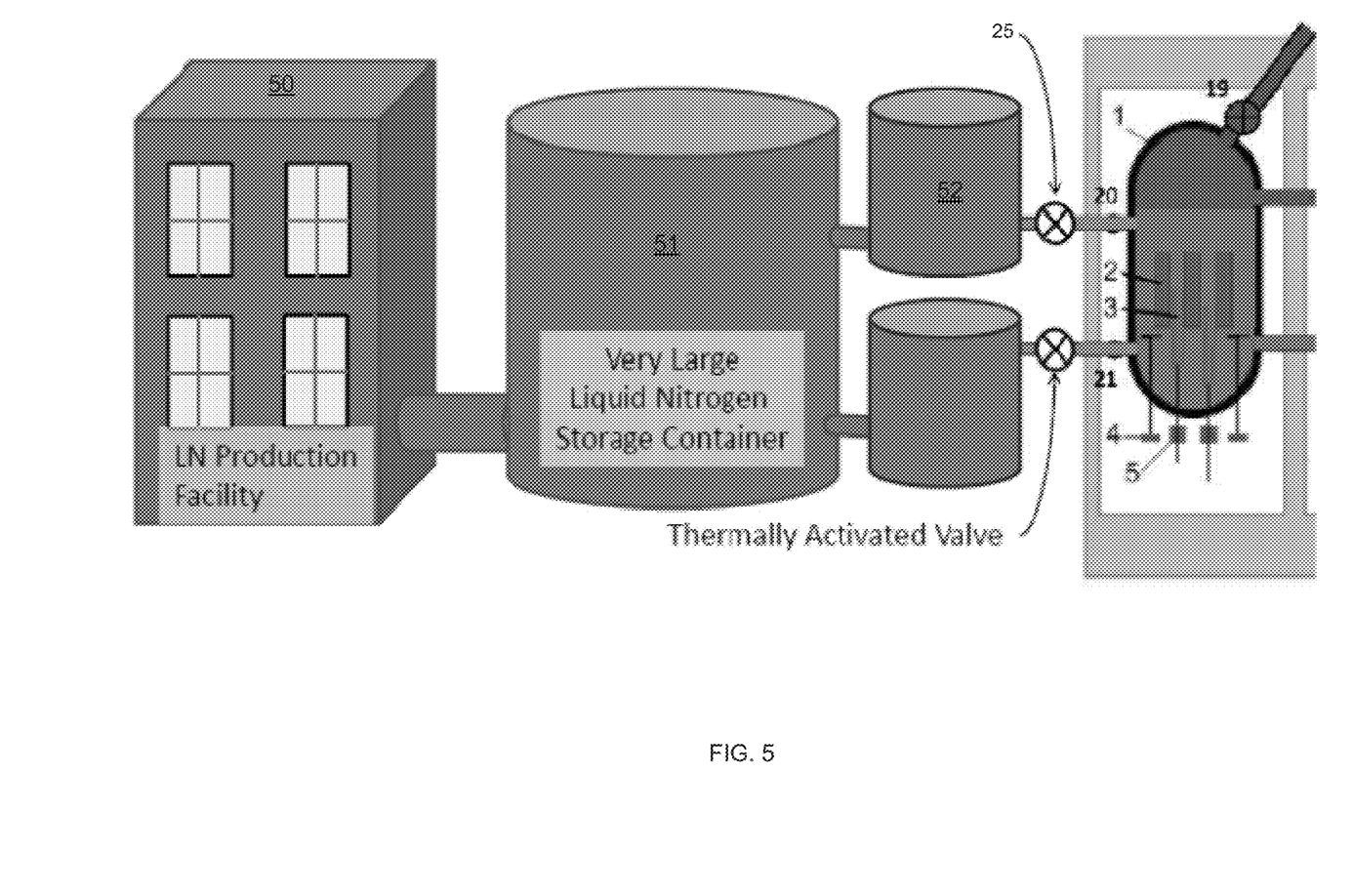
FIG. 5 shows a liquid-nitrogen fabrication facility in accordance with an embodiment of the present invention.

FIG. 5 shows a LN fabrication facility 50 which produces liquid nitrogen on-site to fill at least one very large liquid nitrogen storage container 51, which is linked to at least one liquid nitrogen container 52 that is connected to a nuclear reactor chamber or a containment chamber through a thermally activated valve 25. The fabricator automatically fills the large storage container, which automatically fills the smaller LN container connected to the reactor chamber or containment chamber as its LN content is released into the reactor chamber or the containment chamber.

While the present invention has been described in terms of preferred embodiments, it will be appreciated by one of ordinary skill that the spirit and scope of the invention is not limited to those embodiments, but extend to the various modifications and equivalents as defined in the appended claims.

The invention claimed is:

1. A system, comprising:
 a nuclear reactor chamber comprising an inlet portion;
  wherein the chamber is part of a nuclear power plant,
 at least one container,
  wherein each respective container of the at least one container contains liquid nitrogen and boron powder,
  wherein each respective container comprises an outlet portion in fluid communication with said inlet portion; and
 at least one valve associated with the at least one container,
  wherein each respective container is associated with a respective valve of the at least one valve,
  wherein opening of the at least one valve causes both liquid nitrogen and boron powder to flow from at least one respective container of the at least one container into the chamber.

2. The system of claim 1 wherein a first container has a first volume; and the system further comprising a second container containing liquid nitrogen, the second container having a second volume greater than the first volume, the second container in fluid communication with the at least one container.

3. The system of claim 2, further comprising an apparatus configured to produce liquid nitrogen, the apparatus configured to produce liquid nitrogen is in fluid communication with the first container.

4. The system of claim 2, wherein the boron powder is added into the first container, the boron powder is ejected into the nuclear reactor chamber along with the flow of liquid nitrogen from the first container to the nuclear reactor chamber.

* * * * *